March 10, 1959  D. R. DAYKIN  2,876,950
DIGITAL ANALOG COMPUTER
Filed July 14, 1953  2 Sheets-Sheet 2
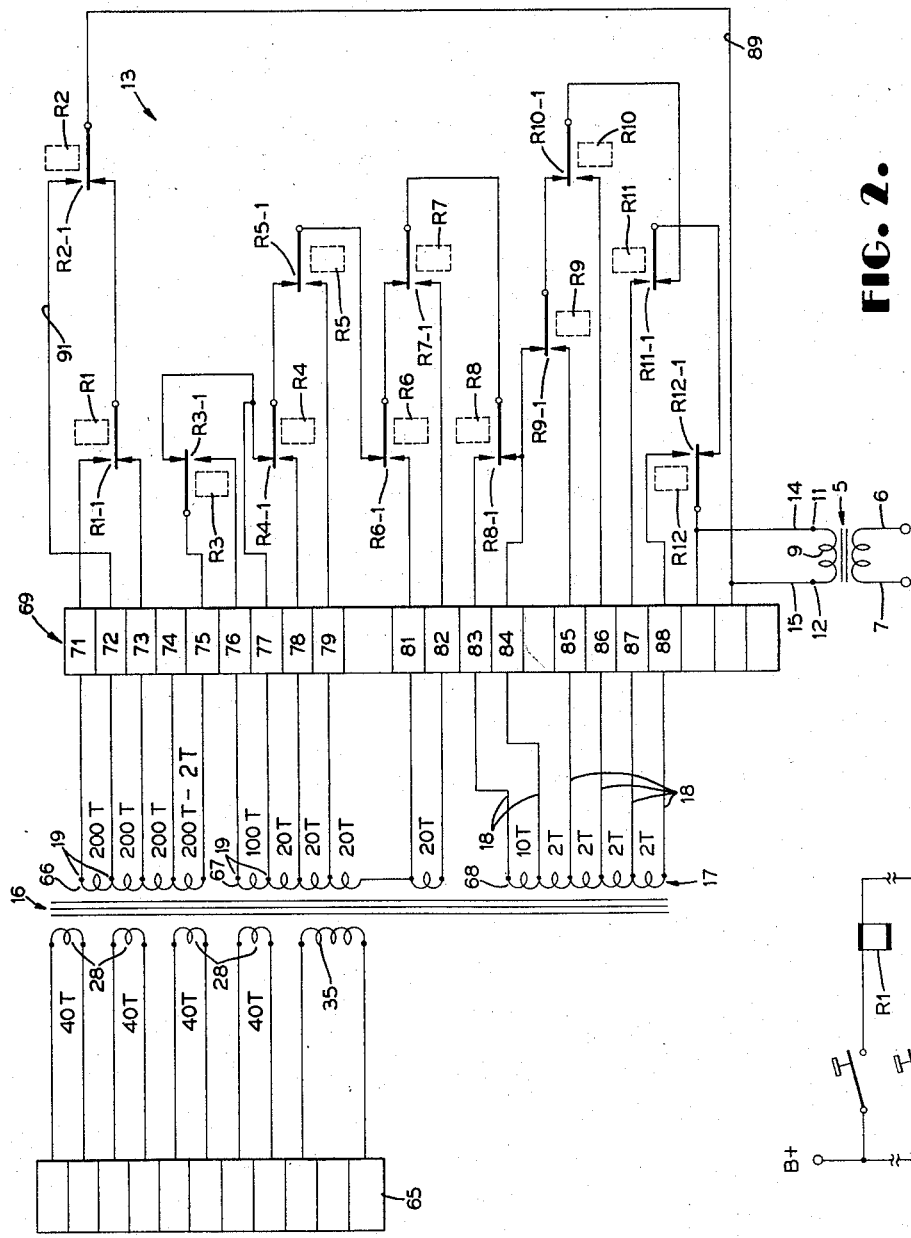
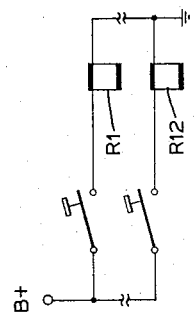
INVENTOR
DONALD R. DAYKIN
BY
ATTORNEY

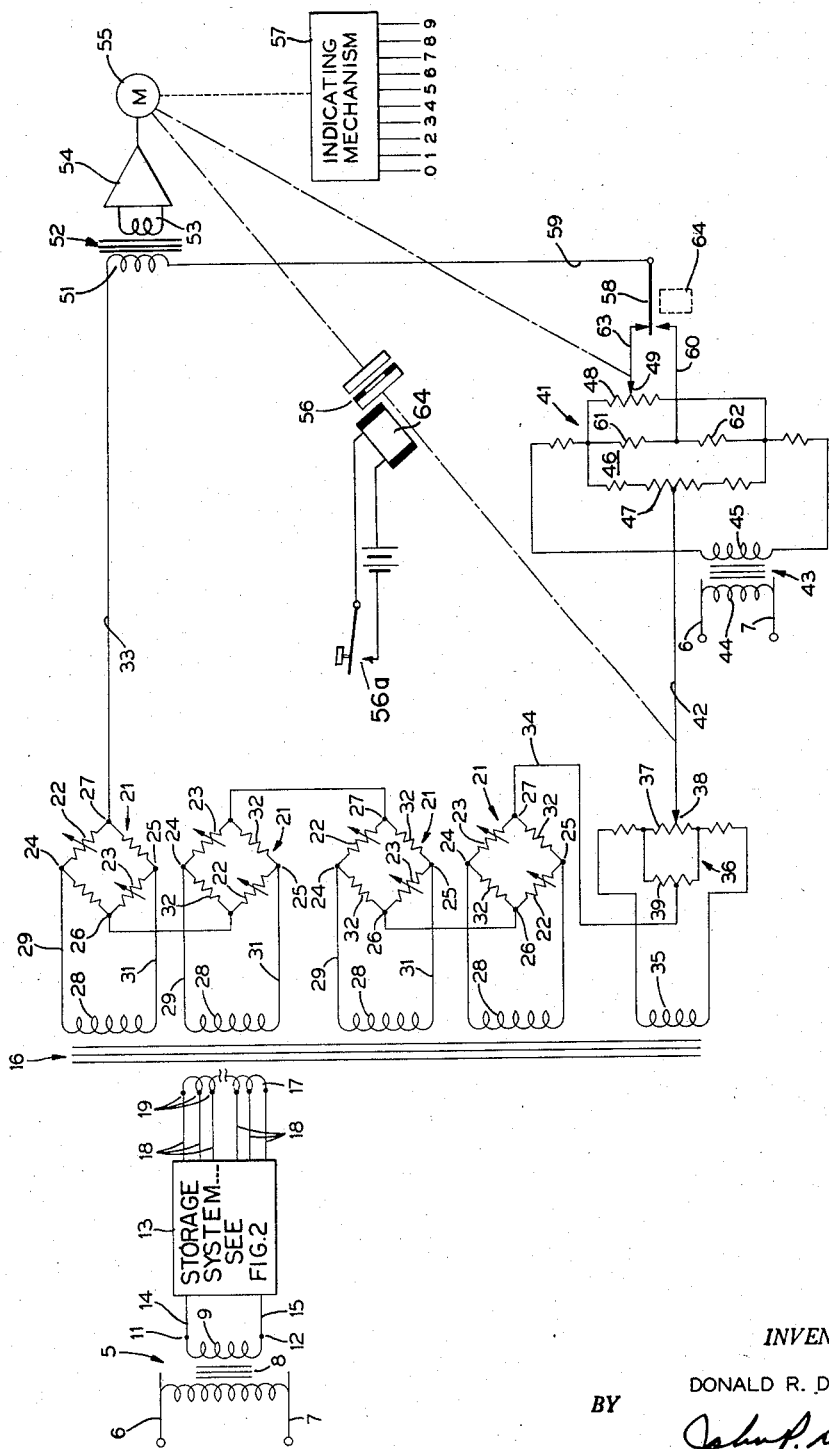

2,876,950

DIGITAL ANALOG COMPUTER

Donald R. Daykin, Endicott, N. Y., assignor to International Business Machines Corporation, New York, N. Y., a corporation of New York Application July 14, 1953, Serial No. 367,925

5 Claims. (Cl. 235—154)

This invention relates to a computer and more particularly to a computer of the type wherein both analog and digital manifestations of data are utilized.

In computing machines it is often desirable to convert data represented in one code to data represented in a different code. Accordingly, it is an object of this invention to provide an improved code converter.

Another object of this invention is to provide an improved analog to digital converter.

A further object of this invention is to provide an improved digital to analog converter.

Still another object of this invention is to provide an improved computer for computing a predetermined analog function of a digital value.

Another object of this invention is to provide an improved computer capable of performing multiplications, divisions, subtractions and additions.

A more specific object of this invention is to provide improved calibrating means for a computer.

According to one specific aspect of this invention, a storage device is provided for storing a value according to its bi-quinary code representation. The storage device controls circuits to connect a number of primary turns of a transformer, directly proportional to the stored value, across a constant source of alternating current voltage. The secondary winding of the transformer is connected to the input of a strain gage bridge. The output of the strain gage bridge is connected with a source of balancing voltage so that a voltage proportional to the differential between the two is produced. A follow-up motor having an indicator connected thereto is activated by the differential voltage to adjust the balancing voltage until the differential voltage is eliminated. The indicator is thus positioned so that it indicates the value of the strain applied to the strain gage bridge divided by the value stored in the storage device. The indication may be digital or analog, in any code desired, and according to any system of notation.

The indicating device utilized in this embodiment may be of the general type set forth in detail in the co-pending U. S. patent application of Donald R. Daykin, Serial No. 367,948, filed July 14, 1953, now Patent No. 2,814,442, to which reference may be made.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 shows, diagrammatically, a circuit arrangement embodying the present invention for performing a computation.

Figs. 2 and 3 show, diagrammatically in more detail, the storage system shown in Fig. 1.

Referring to the drawings, there is shown in Fig. 1 a source of constant alternating current voltage 5 including the lines 6 and 7 and transformer 8 having a secondary winding 9. Terminals 11 and 12 are provided for the secondary winding 9. A storage system 13 is connected with the source of constant alternating current voltage by lines 14 and 15. A transformer 16 having a plurality of primary turns 17 is associated with storage system 13 by a plurality of circuits 18. A plurality of taps 19 are provided for transformer 16.

A plurality of strain gage bridges 21, each having strain sensitive elements 22 and 23, are each provided with an input circuit including a pair of terminals 24 and 25 and an output circuit including a pair of terminals 26 and 27. An individual secondary winding 28 on transformer 16 is provided to supply each of the strain gage bridges with an input voltage. A pair of lines 29 and 31 connect each strain gage bridge with its associated secondary winding 28. The windings 28 may each be identical to the other so that equal voltages are produced across each.

The strain sensitive elements 22 and 23 may be arranged to be strained under an applied stress. Dummy strain sensitive elements 32 may be provided for each bridge to compensate for fluctuations of such factors as heat. An individual stress may be applied to each strain gage bridge 21 to produce an unbalance voltage across the output terminals 26 and 27 proportional to the applied stress. The output circuits of the strain gage bridges are shown connected in series so that a voltage proportional to the algebraic sum of the individual output unbalance voltages appears across lines 33 and 34.

A secondary winding 35 is provided on transformer 16 for supplying a voltage to a zero-adjustment bridge indicated generally at 36. Bridge 36 includes a slide wire resistor 37 having a movable contact 38 thereon and a center tapped resistance element 39.

A source of balancing voltage indicated generally at 41 is provided for balancing the unbalance voltage across lines 33 and 34 as adjusted by the zero-adjustment bridge 36. The zero-adjusted voltage from the series circuit appears across lines 33 and 42. Line 42 is connected to movable contact 38. The source of balancing voltage includes a transformer 43 having a primary winding 44 connected to the lines 6 and 7 and a secondary winding 45 connected across a bridge circuit indicated generally at 46. Bridge circuit 46 includes a center tapped resistance 47 having its tap connected to line 42 and a slide wire resistance 48 having a slide contact 49 thereon. The output of bridge 41 from contact 49 may therefore be applied in phase opposition to the output of the series circuit of strain gages through the primary winding 51 of transformer 52. The secondary winding 53 of transformer 52 is connected to an amplifier 54. The voltage appearing across primary winding 51 is the differential between the balancing voltage and the zero-adjusted unbalance voltage of the series strain gage circuit. Amplifier 54 amplifies the differential voltage and applies the amplified differential voltage to a reversible motor 55. Reversible motor 55 is mechanically connected to slide contact 49 and also through a clutch 56 to slide contact 38. Motor 55 runs to adjust slide contact 49 until the differential voltage across primary winding 51 is eliminated, at which time the motor stops. An indicating device 57 of the type previously mentioned may be mechanically coupled to motor 55 to be driven with contact 49. The indicating device will thus assume a condition in accordance with the position of contact 49 and thus in accordance with the unbalance voltage appearing across lines 33 and 34.

Indicating device 57 may have ten output leads, the selection of which may indicate the digits 0 through 9 for each decade to manifest an output in accordance with the decimal system of notation.

In order to calibrate the system, clutch 56 is actuated by depressing key 56a to energize the coil of magnet 64 to mechanically connect contactor 38 to motor 55 and transfer contact 58 is shifted to connect line 59 through line 60 to a calibrating voltage standard produced by a resistance network including resistors 61 and 62. Line 59 is disconnected from line 63 and thus from contact 49 by the transfer of transfer contact 58. The magnet 64 may be utilized to shift transfer contact 58. With this arrangement motor 55 runs to adjust contact 38 in accordance with the voltage standard.

In an operation for performing a computation, clutch 56 is disengaged and transfer contact 58 is positioned to connect lines 59 and 63. A number of primary turns 17 on transformer 16 are selected by storage system 13 in accordance with a stored value and applied in series across the constant source of alternating current voltage 5 to be actuated thereby. A voltage inversely proportional to the number of primary turns 17 energized by source of voltage 5 is therefore induced in each of the secondary windings 28. Each strain gage bridge circuit is accordingly energized. An individual strain is applied to each strain gage bridge circuit to unbalance the bridge in proportion to the value of the applied strain. The output of each strain gage bridge circuit is therefore proportional to the product of the reciprocal of the value stored in storage system 13 and the value of the individual strain applied to the strain gage bridge. Since the output of each strain gage bridge is connected in a series circuit, the voltage appearing across lines 33 and 34 is equal to the algebraic sum of the several outputs of the strain gauge bridges. The voltage across lines 33 and 42 is therefore related to the algebraic sum of the several outputs, the relating factor being the output of bridge 36 and thus is determined by the position of slide contact 38.

A balancing voltage is applied from source 41 over line 63, through transfer contact 58, and over line 59 to primary winding 51 in opposition to the voltage across lines 33 and 42. The differential voltage appearing across primary winding 51 induces a voltage in secondary winding 52. This induced voltage is amplified by amplifier 54 which may be of the type disclosed in the patent of H. F. Parker et al., No. 2,218,477, issued October 15, 1940, and applied to actuate motor 55 to run in a direction dependent on the phase of the applied voltage. Motor 55 runs to adjust contact 49 until the differential voltage is substantially zero and then stops. Since indicator 57 is coupled to motor 55, indicator 57 assumes a condition in accordance with the position of contact 49 and thus a condition in accordance with the voltage across lines 33 and 42. Indicator 57 therefore manifests a digital representation of the analog voltage across lines 33 and 42.

Referring to Fig. 2 there is shown in more detail that portion of the circuit of Fig. 1 supplying inputs to the various bridge ciruits. A terminal strip 65 may be employed to connect the various strain gage bridges across the various secondary windings 28 of transformer 16. Transformer 16 is shown including individual primary windings 66, 67, and 68, each having a plurality of taps 19. A plurality of circuits 18 are shown connecting the various taps 19 to a terminal strip 69. An example of one form of a storage or switching system adapted for use in this invention is diagrammatically shown and generally referred to at 13.

It is well known in the art that values of a system of notation may be stored in a relay circuit. The present illustrative relay circuit is one adapted to store values in the decimal system of notation in a bi-quinary code form and includes transfer contacts R1–1, R2–1, R3–1, R4–1, R5–1, R6–1, R7–1, R8–1, R9–1, R10–1, R11–1, and R12–1. Any digit in the decimal system may be represented in a bi-quinary code by five devices each having two stable states. By selectively switching the above mentioned transfer contacts a value may be set in storage. Values, for example, from 20.0 to 49.9 may be set in storage system 13.

The circuits 18 associating primary winding 66 with storage system 13 include terminal blocks 71 through 75; the circuits 18 associating primary winding 67 with storage system 13 include terminal blocks 76 through 82; and the circuits 18 associating primary winding 67 with storage system 13 include terminal blocks 83 through 88. By way of example, two hundred turns of primary winding 66 may be included in the circuit between terminal block 71 and terminal block 72 and a like number between each of the terminal blocks 72, 73, 74, and 75. One hundred turns of primary winding 67 may be included in the circuit between terminal block 76 and terminal block 77 and twenty turns between each of the terminal blocks 77, 78, 79, 81, and 82. Ten turns of primary winding 68 may be included in the circuit between terminal block 83 and terminal block 84 and two turns between each of the terminal blocks 84, 85, 86, 87, and 88.

The exemplary storage system shown comprises a tenths order, a units order, and a portion of a tens order. The tens order includes transfer contacts R1–1 and R2–1. The units order comprises transfer contacts R3–1, R4–1, R5–1, R6–1, and R7–1. The tenths order comprises transfer contacts R8–1, R9–1, R10–1, R11–1, and R12–1. By transferring selected ones of the transfer contacts in an order a digit in the decimal system of notation may be stored therein in the bi-quinary code. It may be seen from Fig. 2 that the transfer contacts of the storage system control or select the primary turns included in the circuit across the source of voltage 5. Fig. 3 shows a manually operated circuit for switching the transfer contacts.

For example, the value 35.8 may be stored in the storage system by switching transfer contacts R2–1 in the tens order, transfer contact R3–1 in the units order and transfer contacts R8–1 and R11–1 in the tenths order. By tracing the circuit from line 15 it is seen that a circuit is completed over line 89 through the R2–1 normally open (N/O) contact, over line 91 to terminal block 72, from terminal block 72 through primary winding 66 to terminal block 75, from terminal block 75 through R3–1 N/O to terminal block 76, from terminal block 76 through primary winding 67 to terminal block 77, from terminal block 77 through contact R4–1 normally closed (NC), through R5–1 N/C, through R6–1 N/C, through R7–1 N/C, through R8–1 N/O to terminal block 83, from terminal block 83 through primary winding 68 to terminal block 87, from terminal block 87 through R11–1 N/O, through R12–1 N/C, and to line 14. It may thus be seen that the value 35.8 has been stored and a circuit has been established through a number of primary turns on transformer 16 less two turns to compensate for errors introduced by leading of source 5 directly proportional to 35.8, the factor of proportionality being 20. It may also be seen that these selected primary turns have applied across them the voltage from source 5. The voltage induced on a secondary winding 28 will thus be proportional to the reciprocal of 35.8.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a computer, the combination of a bridge network having an input and an output and adapted to be unbalanced to an extent proportional to a variable condition, a constant source of alternating current voltage, a transformer including a plurality of primary turns, a plurality of circuits associating said source of voltage with said plurality of primary turns, a storage system for storing a digital value to control said plurality of circuits so that said source of voltage is connected across a number of said primary turns corresponding to a stored digital value, a secondary winding on said transformer for delivering to said input a voltage proportional to a function of said stored digital value so that a voltage is produced at said output proportional to the product of the reciprocal of said digital value and the value of said variable condition.

2. In a computer, the combination of a plurality of strain gage bridges each having an input circuit and an output circuit and each adapted to be unbalanced to an extent proportional to an independently applied strain, means for connecting said output circuits to form a series circuit including said plurality of bridges, a plurality of sources of voltage variable to represent different values of a system of notation, a plurality of outputs for said variable sources of voltage, one applied across each of said input circuits, means to vary said variable sources of voltage in accordance with a value in said system of notation so that a voltage is produced across said series circuit proportional to the product of the reciprocal of said value and the sum of the values of said independently applied strains, means for generating a balancing voltage, means for applying said balancing voltage in opposition to the voltage produced across said series circuit and for deriving a difference voltage corresponding to the difference between said balancing voltage and the voltage produced across said series circuit, and follow-up driving means responsive to said difference voltage for adjusting said balancing voltage generating means to substantially eliminate said difference voltage.

3. In a computer, the combination of a plurality of strain gage bridges each having an input circuit and an output circuit and each adapted to be unbalanced to an extent proportional to an independently applied strain, means for connecting said output circuits to form a series circuit including said plurality of bridges, a plurality of sources of voltage variable to represent different values of a system of notation, a plurality of outputs for said variable sources of voltage, one applied across each of said input circuits, means to vary said variable sources of voltage in accordance with a value in said system of notation so that a voltage is produced across said series circuit proportional to the product of the reciprocal of said value and the sum of the values of said independently applied strains, means for generating a balancing voltage, means for applying said balancing voltage in opposition to the voltage produced across said series circuit and for deriving a difference voltage corresponding to the difference between said balancing voltage and the voltage produced across said series circuit, follow-up driving means responsive to said difference voltage for adjusting said balancing voltage generating means to substantially eliminate said difference voltage, and a digital indicator adapted to be conditioned by said follow-up driving means in accordance with the adjustment necessary to eliminate said difference voltage.

4. In a computer, the combination of a constant source of alternating current voltage, a transformer including a plurality of primary turns, a plurality of circuits associating said source of voltage with said plurality of primary turns, a storage system for storing a digital value of a system of notation in accordance with a first code to control said plurality of circuits so that said source of voltage is connected across a number of said primary turns corresponding to a stored value, a plurality of strain gage bridges each having an input circuit and an output circuit and each adapted to be unbalanced to an extent proportional to an independently applied strain, means for connecting said output circuits to form a series circuit including said plurality of bridges, a plurality of secondary windings on said transformer each adapted to deliver a voltage proportional to the reciprocal analog of said stored digital value, means for connecting each of said secondary windings to one of the input circuits of said plurality of strain gage bridges so that a voltage is produced across said series circuit proportional to the product of the reciprocal analog of said stored digital value and the sum of the values of said independently applied strains, means for generating a balancing voltage, means for applying said balancing voltage in opposition to the voltage produced across said series circuit and for deriving a difference voltage corresponding to the difference between said balancing voltage and the voltage produced across said series circuit, follow-up driving means responsive to said difference voltage for adjusting said balancing voltage generating means to substantially eliminate said difference voltage, and an indicator adapted to be positioned by said follow-up driving means in accordance with the adjustment necessary to eliminate said difference voltage for manifesting a digital value of a system of notation in accordance with a second code.

5. In a computer, the combination of a plurality of strain gage bridges each having an input circuit and an output circuit and each adapted to be unbalanced to an extent proportional to an independently applied strain, means for connecting said output circuits to form a series circuit including said plurality of bridges, a plurality of sources of voltage all variable to represent different values of a system of notation, a plurality of outputs for said variable sources of voltage, one applied across each of said input circuits, means to vary said variable sources of voltage in accordance with a value in said system of notation so that a voltage is produced across said series circuit proportional to the product of the reciprocal of said value and the sum of the values of said independently applied strains, means for generating a balancing voltage, means for generating a calibrating voltage, means for applying said calibrating voltage in series with the voltage across said series circuit, means for applying said balancing voltage in opposition to the algebraic sum voltage produced across said series circuit and said calibrating voltage and for deriving a difference voltage proportional to the difference between said balancing voltage and the voltage produced across said series circuit and said calibrating voltage, a source of standardizing voltage, means for applying said standardizing voltage in opposition to the algebraic sum of said calibrating voltage and the voltage across said series circuit to produce a calibrating differential voltage, follow-up driving means alternately responsive to said difference voltage for adjusting said balancing voltage generating means to substantially eliminate said difference voltage and alternately responsive to said differential calibrating voltage for adjusting said calibrating voltage to substantially eliminate said calibrating differential voltage respectively.

References Cited in the file of this patent

UNITED STATES PATENTS

| | | |
|---|---|---|
| 2,398,421 | Frische et al. | Apr. 16, 1946 |
| 2,461,438 | Page et al. | Feb. 8, 1949 |
| 2,471,292 | Taylor | May 24, 1949 |
| 2,478,720 | Sourwine et al. | Aug. 9, 1949 |
| 2,491,095 | Enns | Dec. 13, 1949 |
| 2,535,942 | Lewis et al. | Dec. 26, 1950 |
| 2,540,807 | Berry | Feb. 6, 1951 |
| 2,543,650 | Walker | Feb. 27, 1951 |
| 2,581,205 | Reilly | Jan. 1, 1952 |
| 2,584,897 | Marco | Feb. 5, 1952 |
| 2,597,751 | Ruge | May 20, 1952 |
| 2,611,538 | Hatton | Sept. 23, 1952 |
| 2,625,822 | Nichols | Jan. 20, 1953 |
| 2,631,778 | Piper et al. | Mar. 17, 1953 |
| 2,738,504 | Gray | Mar. 13, 1956 |

OTHER REFERENCES

Electronic Weighing System, Electronics, December 1951, page 136.